United States Patent [19]

Jones

[11] Patent Number: 4,574,267

[45] Date of Patent: Mar. 4, 1986

[54] TIRE PRESSURE WARNING SYSTEM

[75] Inventor: Trevor O. Jones, Shaker Heights, Ohio

[73] Assignee: TRW Inc., Cleveland, Ohio

[21] Appl. No.: 744,893

[22] Filed: Jun. 14, 1985

Related U.S. Application Data

[63] Continuation of Ser. No. 375,699, May 6, 1982, abandoned.

[51] Int. Cl.$^4$ .............................................. B60C 23/00
[52] U.S. Cl. ................... 340/58; 340/870.11; 340/870.16; 340/669; 116/34 R; 73/146.2; 73/146.4; 200/61.22
[58] Field of Search ............... 340/58, 870.03, 870.11, 340/870.16, 870.3, 657, 666, 665, 669, 686; 116/34 R; 73/146, 146.2, 146.3-146.5, 493, 495, 510, 511, 505-507, DIG. 4; 310/311, 314, DIG. 1; 200/61.22-61.26, 61.45 R, 61.45 M, 61.48

[56] References Cited

U.S. PATENT DOCUMENTS

| | | | |
|---|---|---|---|
| 1,974,906 | 9/1934 | Willcox | 340/58 |
| 2,070,743 | 2/1937 | McDonnell | 340/58 |
| 2,253,118 | 8/1941 | Gillespie et al. | 340/58 |
| 2,957,058 | 10/1960 | Trott | 340/58 |
| 3,588,814 | 6/1971 | Furlong | 340/58 |
| 3,613,075 | 10/1971 | Griffiths et al. | 340/58 |
| 4,149,140 | 4/1979 | Evans et al. | 340/58 |
| 4,210,898 | 7/1980 | Betts | |

FOREIGN PATENT DOCUMENTS

| | | | |
|---|---|---|---|
| 22096 | 1/1981 | European Pat. Off. | 340/58 |

OTHER PUBLICATIONS

SAE Paper #680,408, by Richard E. Rasmussen and Anthony D. Cortese, pp. 1412-1420.

Primary Examiner—Donnie L. Crosland
Attorney, Agent, or Firm—Yount & Tarolli

[57] ABSTRACT

A tire inflation pressure detector which senses changes in tire pressure by detecting the changes in the spring rate of the tire which result from changes in tire pressure. An accelerometer (40) is mounted on a vehicle suspension component adjacent the tire. The accelerometer is sensitive to vertical accelerations experienced by the tire and provides a signal indicative thereof. A filter bank (64) processes the accelerometer signal so as to define the frequency distribution of the accelerometer output signal. A microcomputer (100) responds to the signals provided by the filters and locates the low frequency resonance peak whose position is influenced by the tire spring rate. The microcomputer determines whether tire pressure is low in accordance with the frequency of the resonance peak.

15 Claims, 9 Drawing Figures

4,574,267

TIRE PRESSURE WARNING SYSTEM

This application is a continuation of application Ser. No. 375,699, filed May 6, 1982 now abandoned.

BACKGROUND AND FIELD OF THE INVENTION

The present invention relates to systems for automatically detecting deviations in tire inflation pressure from a desired value.

It is important that the tires of a motor vehicle remain properly inflated. When the tires of a motor vehicle are under-inflated, they provide greater rolling resistance and therefore reduce the fuel economy obtainable with the vehicle. Under-inflated tires also experience greater flexing than properly inflated tires, leading to a decrease in usable tire life. For these reasons, then, tire pressures should periodically be checked to verify proper tire inflation.

Traditionally, inflation pressure of the tires of a motor vehicle has been checked by stopping the vehicle and manually applying a tire pressure gauge to each tire in turn. Motor vehicle operators are often lax in performing this procedure, however, either because they are unaware of the disadvantages of under-inflation of the tires, are unschooled in the procedure used for checking tire inflation, or are simply too busy or forgetful to regularly conduct tire inflation checks. As a consequence, many motor vehicles are operated with under-inflated tires. It would be desirable to provide an automatic system for monitoring tire pressure so that a motor vehicle operator would know when the vehicle's tires required re-inflation.

An automatic tire inflation monitor would also be useful in detecting flat tires. Normally, the detection of flat tires is a trivial exercise since a flat tire has an immediate and noticeable influence on the handling characteristics of the vehicle. This is not always the case, however. A new type of tire, referred to as a "run flat" tire, is now finding increasing use on motor vehicles. A "run flat" tire is designed to support the motor vehicle even in the event of a significant loss in tire pressure, thereby permitting the vehicle to be driven for a short distance without changing the tire. Unlike a flat in a conventional tire, a flat in a "run flat" tire may not be readily perceptible to the motor vehicle operator. An automatic system for warning the operator of the flat would therefore be useful.

Fluid pressure is usually monitored by in situ pressure sensors. Such sensors cannot be conveniently used in tires mounted on a motor vehicle, since the tires rotate. The communication of electrical signals between a pressure sensor rotating with a vehicle tire and other, non-rotating instrument components is not easily accomplished. It would be desirable, therefore, if a tire deflation warning system could be devised which did not require interfaces to the tires.

SUMMARY OF THE INVENTION

The present invention provides a system for automatically monitoring tire inflation pressures by detecting shifts in the spring rate of the tire, as mounted on the vehicle. Accelerometers are mounted on suspension members adjacent each tire such that the accelerometers measure the vertical accelerations undergone by each tire. The frequency spectrum of the signal provided by each accelerometer includes a pronounced low frequency peak whose position is influenced by tire spring rate and thus by tire inflation pressure. The signals provided by the accelerometers are processed so as to identify the location of the low frequency peak, which thereafter is correlated to changes in tire inflation pressure.

The tire inflation pressure monitoring system does not require an in situ pressure sensor, so it is not necessary to couple electrical signals into and out of the rotating tire.

BRIEF DESCRIPTION OF THE DRAWINGS

The foregoing and other objects and advantages of the present invention will become more readily apparent from the following detailed description, as taken in conjunction with the accompanying drawings, wherein.

DETAILED DESCRIPTION

Figure 1:
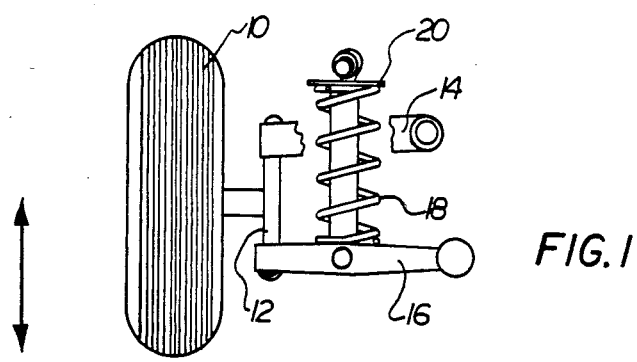
FIG. 1 is a schematic representation of a tire suspension for a motor vehicle.

FIG. 1 is a simplified front elevation view of one type of suspension system for a front tire in a conventional passenger car. As shown in this Figure, the tire 10 is supported on a spindle 12. The spindle 12 is in turn mounted in ball joints carried by one end of an upper control arm 14 and lower control arm 16. The opposite ends of the upper and lower control arms 14 and 16 are pivotably attached to the vehicle frame (not shown in FIG. 1). The frame, spindle, and upper and lower control arms form a conventional 4-bar linkage. The vehicle is sprung upon the lower control arm 16 on a coil spring 18 with which a shock absorber 20 is mounted coaxially. As the tire 10 travels along a bumpy or uneven road, the wheel 10 moves up and down against the bias of the spring 18. The shock absorber 20 damps the spring-induced oscillations.

Figure 2:
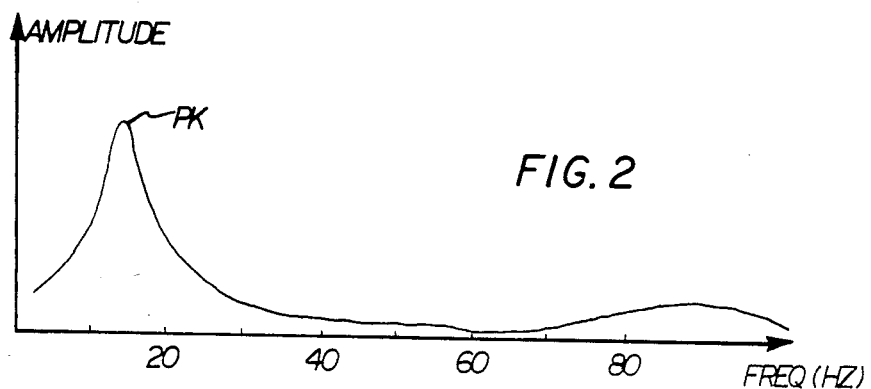
FIG. 2 is a graph of the frequency spectrum of the accelerations undergone by the suspension system of FIG. 1.

The frequency distribution of the accelerations undergone by the wheel 10 during normal road driving are shown in FIG. 2. As can be seen in FIG. 2, the frequency response of the suspension system exhibits a pronounced peak (PK) at a frequency between 10 and 20 Hz. As has been noted in the art, e.g., SAE Paper No. 680,408, the location of the peak is, in part, dependent upon the effective spring rate of the tire 10, which is in turn dependent upon the inflation pressure of the tire. As is generally described in the SAE Paper, the frequency of the suspension resonance which produces the peak PK is functionally related to the squareroot of the tire spring rate. Consequently, if the tire spring rate decreases (as it will if the inflation pressure diminishes), the resonant frequency will also decrease.

Figure 3:
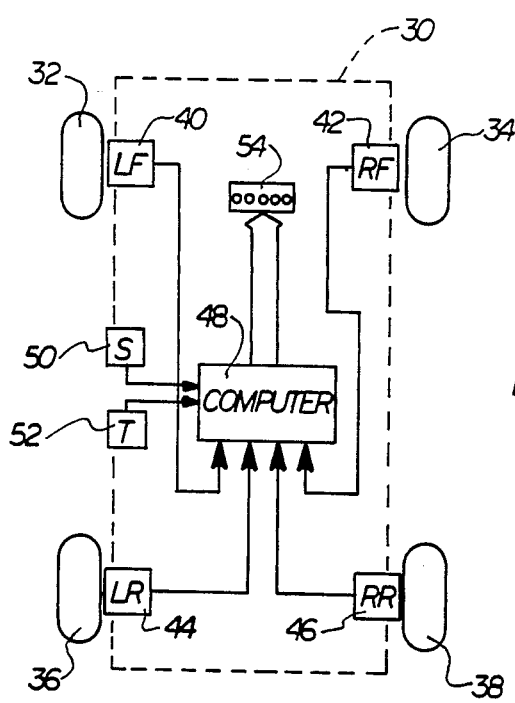
FIG. 3 is a schematic representation of the tire pressure monitoring system of the present invention, showing the general layout of the individual components.

In accordance with the present invention, the relationship between inflation pressure and resonant frequency is used in a system for detecting changes in inflation pressure of the tires of a conventional motor vehicle. The general layout of the system components is shown in FIG. 3. In FIG. 3, the motor vehicle 30 is shown as including four tires 32, 34, 36 and 38. Mounted adjacent each tire is a respective accelerometer 40, 42, 44 and 46. Each accelerometer is affixed to a suspension component adjacent the tire in such a location and orientation that the accelerometer senses the vertical accelerations undergone by the corresponding tire. The output signals provided by the four accelerometers 40, 42, 44 and 46 are applied to a microcomputer controlled signal processing system 48. A speed sensor 50 and temperature sensor 52 also provide signals to the signal processing system 48. The signal processing system 48 monitors the accelerations undergone by the four tires, determines the low frequency resonance of each tire, and decides from the resonant frequencies whether the inflation pressure in any of the four tires has changed by more than a permitted amount. Although described hereinafter with reference to detection of low tire pressure, the techniques disclosed herein could also be used to detect excessive tire pressure.

The processing system 48 provides output signals to a control and display panel 54 which is mounted so as to be viewable by the motor vehicle operator. The panel 54 includes four lights, one associated with each of the four tires. When the signal processing system 48 determines that the inflation pressure in one or more of the tires is below the desired value, a corresponding light on the control and display panel is illuminated. The processing system 48 may also actuate an audible alarm associated with the panel 54. The panel 54 also includes a manually operable switch for use in calibration of the system. Each time the operator inflates or verifies the degree of inflation of the four tires of the vehicle, he will depress the calibration switch. This informs the microcomputer that the inflation pressures are then correct, whereafter the computer calculates the resonant frequencies for the four tires, and utilizes the resonant frequencies as standards against which later measurements are compared. The calibration of the system in this manner is desirable since the location of the resonant peak produced by a properly inflated tire may change over extended periods of time due to shock absorber wear, aging of bushings associated with the suspension, etc. Tire wear may also affect the location of the resonant peak, since the spring rate of the tire may change as the tire wears.

The system operates in two different modes, depending upon the length of time that the vehicle has been operating at road speeds. The two different modes are provided since the tire temperature has an influence on the tire spring rate. Thus, changes in the resonant frequency of a given one of the four tires may be caused by changes in temperature, rather than changes in cold inflation pressures for the tire.

In order to overcome the foregoing problem, some means must be provided for determining the temperature of the tire at the time that frequency measurements are taken. Unfortunately, the only direct way to measure the tire temperature is by the provision of a temperature sensor on the tire itself. Mounting a sensor on the tire, however, requires an electrical coupling into and out of the rotating tire, an eventuality intended to be avoided by the present invention. Since direct measure of the tire's temperature must be avoided, an inferential technique is used. It is known that if a vehicle has been sitting unused for some period of time, the tires will be at ambient temperature. Consequently, if a temperature sensor is included to measure ambient temperature, then its signal is also representative of tire temperature for some short period of time after the vehicle starts moving.

The first mode of operation of the system arises during the times when the motor vehicle is first operated after having been unused for more than a predetermined period of time, such as an hour or more. During such times, the resonant frequencies identified by the signal processing system 48 are normalized in accordance with ambient temperature and then compared against the resonant frequency standards obtained after the operator last pushed the calibration button on the control panel 54.

After the motor vehicle has been operating for a period of time, the tires will presumably no longer be at ambient temperature. Consequently, resonant frequency normalization in accordance with ambient temperature may no longer be accurate. The system therefore switches to the second mode of operation. In the second mode of operation, the measured resonant frequencies are no longer compared against the resonant frequency standards used in the first mode of operation. Instead, the resonant frequencies of tires on opposite sides of the vehicle are compared. Thus, for example, the resonant frequency of the left front tire 32 is compared against the resonant frequency of the right front tire 34, whereas the resonant frequency of the left rear tire 36 is compared against the resonant frequency of the right rear tire 38. The corresponding tires on opposite sides of the vehicle are mounted in similar fashions and experience substantially the same environment. Thus, changes in the resonant frequency of one should be reflected in changes in the resonant frequency of the other, if tire pressure is the same for both. Differences in the resonant frequencies are used to identify underinflated tires.

Figure 4:
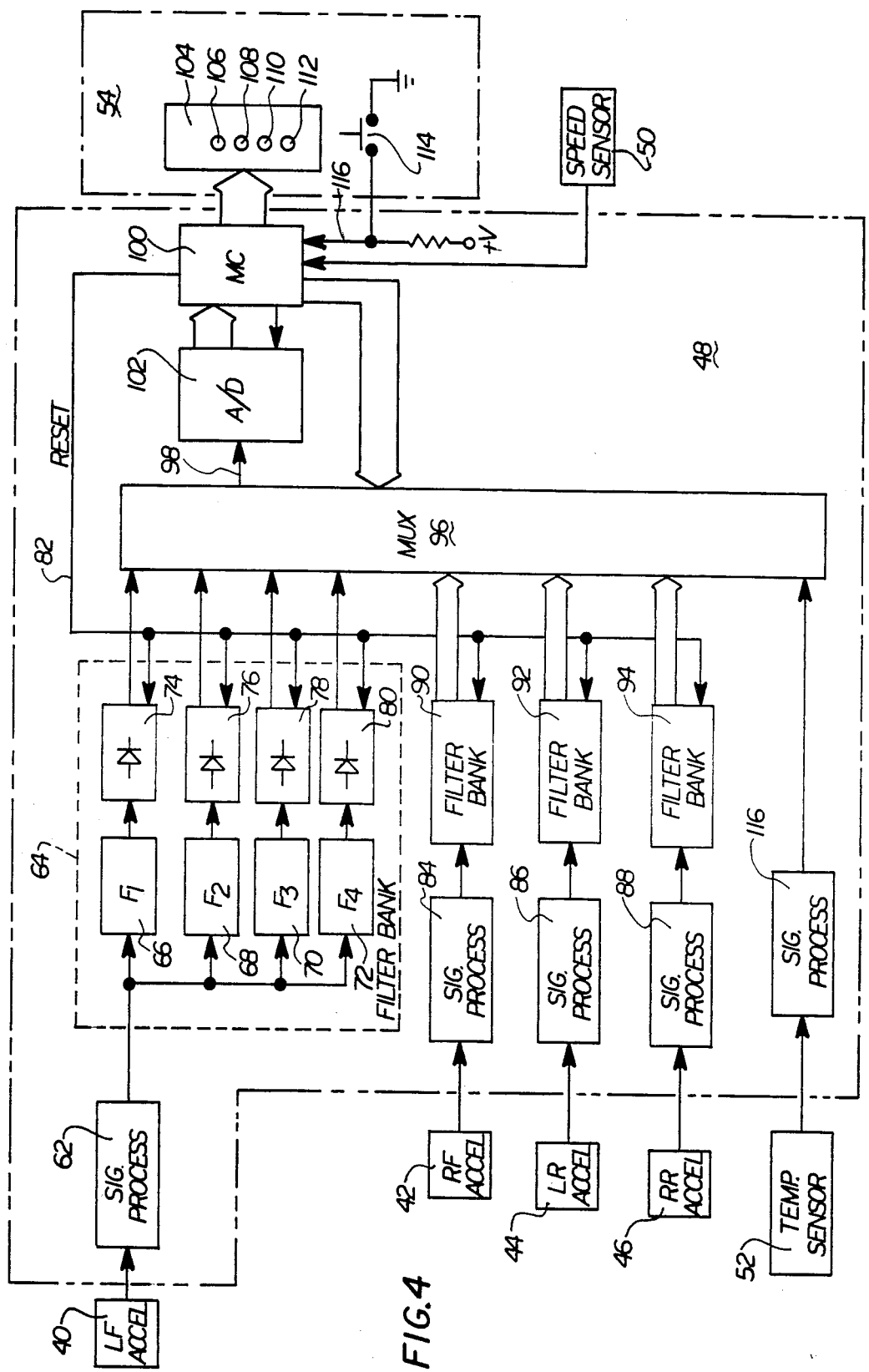
FIG. 4 is a block diagram of the circuitry which processes the accelerometer output signals to determine changes in tire inflation pressure.

FIG. 4 is a more detailed block diagram of the individual components of the system shown in FIG. 3. As shown in FIG. 4, the output of the left front (LF) accelerometer 40 is directed to a signal processor 62. The signal processor 62 includes a transducer amplifier, a low-pass filter having a cutoff frequency of perhaps 1 kHz, and an instrument amplifier. The output of the signal processor 62 is directed to a filter bank 64. The purpose of the filter bank 64 is to identify the signal power in each of plural discrete frequency bands so as to provide information from which the location of the frequency peak PK of FIG. 2 can be determined. In the embodiment shown in FIG. 4, the filter bank 64 includes four band pass filters 66, 68, 70 and 72, the input of each of which is connected to the output of signal processor 62.

Each bandpass filter is designed to pass only a very narrow range of frequencies, whereby its output is essentially representative of only a single frequency component of the accelerometer output signal. The center frequencies of the bandpass characteristics of the four filters 66, 68, 70 and 72 are selected to correspond with four discrete frequencies across the range of frequencies within which it is expected that the peak influenced by the tire spring rate will occur. By measuring the power of the output signals provided by the four filters, the amplitude of the frequency spectrum of FIG. 2 may be defined at four discrete points in the vicinity of the peak PK, enabling the location of the peak to be determined.

A number of filters other than four can be used if it is desired to map the frequency spectrums with greater (or lesser) resolution. In fact, techniques may be used which totally eliminate the need for discrete filters. A frequency spectrum can be assembled, for example, by using a fast fourier transform (FFT) algorithm to process the signals, either in real time or on a delayed basis. Many FFT systems, hardware and/or software, are known in the art, and could readily be used to process the accelerometer output signal.

The filter bank 64 of FIG. 4 also includes four peak rectifier and integrator circuits 74, 76, 78 and 80, each of which has its input connected to the output of a respective one of the four bandpass filters 66, 68, 70 and 72. Each of the peak rectifier and integrator circuits functions to peak rectify the output signal provided by a corresponding bandpass filter, and to then integrate the resulting varying DC signal so as to derive an integral representative of the average power of the corresponding frequency component in the accelerometer output signal.

The integrators associated with the circuits 74, 76, 78 and 80 are reset each time a new data acquisition interval begins. Each of the circuits 74, 76, 78 and 80 includes a "reset" input line, where all of the inputs are connected in parallel to a single reset line 82 in the FIG. 4 embodiment. When the signal provided along reset line 82 is at a high logic level, the integrators associated with the four circuits 74, 76, 78 and 80 will be reset to zero, and will remain reset until the high logic level signal is removed. When the reset signal is at a low logic level, however, the integrators are active, integrating the peak rectified signals provided to the integrators.

The outputs of the other three accelerometers 42, 44 and 46 are in each case processed by similar circuitry, including respective signal processors 84, 86 and 88 and filter banks 90, 92 and 94. The outputs of the four peak rectifier and integrator circuits associated with each of the four filter banks 64, 90, 92 and 94 are all directed to corresponding inputs of a multiplexer 96. The multiplexer 96 may be thought of as the equivalent of a rotary switch, controllable to connect any given one of its input lines to its single output line 98.

The operation of the multiplexer 96 is controlled by a microcomputer 100. The microcomputer 100 may take any convenient form. It will include a microprocessor, read-only memory (ROM) containing a fixed program to be executed by the microprocessor, random-access memory (RAM) to be used by the microprocessor for temporary storage of data during the execution of the ROM program, at least two timers controlled by the microprocessor (referred to hereinafter as timers A and B), and suitable input and output ports for interfacing the microprocessor with external circuits. The foregoing microcomputer elements are all conventional, as is their connection into an operating microcomputer. For simplicity of description, therefore, the microcomputer hardware elements will not be described in greater detail. The software (program) executed by the microcomputer will be described hereinafter with reference to FIGS. 5-8.

Generally, the microcomputer reads the output signals provided by the plural filter banks and processes the resulting data to determine the inflation state of the four tires. At the conclusion of a predetermined signal integrating interval, the microcomputer 100 provides control signals to multiplexer 96 such that a selected one of the filter bank output lines is connected to the multiplexer output line 98, and thus to the input of an analog-to-digital (A/D) converter 102. The microcomputer 100 then reads the digital output signal provided by A/D converter 102, and increments the control signal provided to multiplexer 96 such that the next sequential filter bank output line is connected to the input of A/D converter 102. Microcomputer 100 thus sequentially reads digital signals corresponding to the amplitudes of the signals provided at the outputs of the plural integrators associated with the four filter banks 64, 90, 92 and 94. After reading the amplitudes of the signals accumulated by each of the integrators, the microcomputer 100 provides a reset signal upon reset line 82, thereby resetting all of the integrators to a zero state.

The microcomputer 100 thereafter processes the newly acquired digital information in order to determine from the information whether the inflation pressure within one or more of the tires is low. The microcomputer 100 controls a light array 104 associated with the control panel 54. The light array includes four lamps 106, 108, 110 and 112, each associated with a corresponding one of the four wheels of the vehicle. As stated previously, when the microcomputer 100 determines that a low inflation condition exists in one or more of the tires, it provides control signals to the lamp array 104 such that the corresponding lamp or lamps are illuminated an audible alarm may also be sounded.

The control panel 54 also includes a calibration switch 114 which will be depressed by the operator each time he has re-inflated the tires to their proper cold inflation pressures. The data next acquired by the microcomputer 100 from the four filter banks 64, 90, 92 and 94 is stored in RAM and used thereafter as reference data against which data acquired in the future will be compared. Until such time as a reference is acquired and stored in RAM, the microcomputer 100 will cause all four of the lamps 106, 108, 110 and 112 to flash on and off in unison.

Power is continually applied to at least one of the timers (timer B) internal to the microcomputer. Power is also continually applied to the random access memory section of the microcomputer, whereby the data stored the memory section is not lost each time the ignition switch is turned off.

The control system 48 also includes a signal processor 116 for processing the output of temperature sensor 52. The output of signal processor 116 is an analog signal having an amplitude representative of the temperature of the vehicle. The output signal is applied to a corresponding input line to multiplexer 96, and will be read by the microcomputer as part of its normal programmed operation.

The speed sensor 50 will generally be a tachometer of the type which produces a pulse train having a pulse repetition rate which is directly proportional to the rotational speed of the mechanical element to which it is connected. The tachometer will usually be attached to the odometer cable, but may instead be attached to any other suitable element of the vehicle whose rotational speed is representative of vehicle speed. The output signal provided by speed sensor 50 is directly applied to a serial input port of microcomputer 100.

Figure 5:
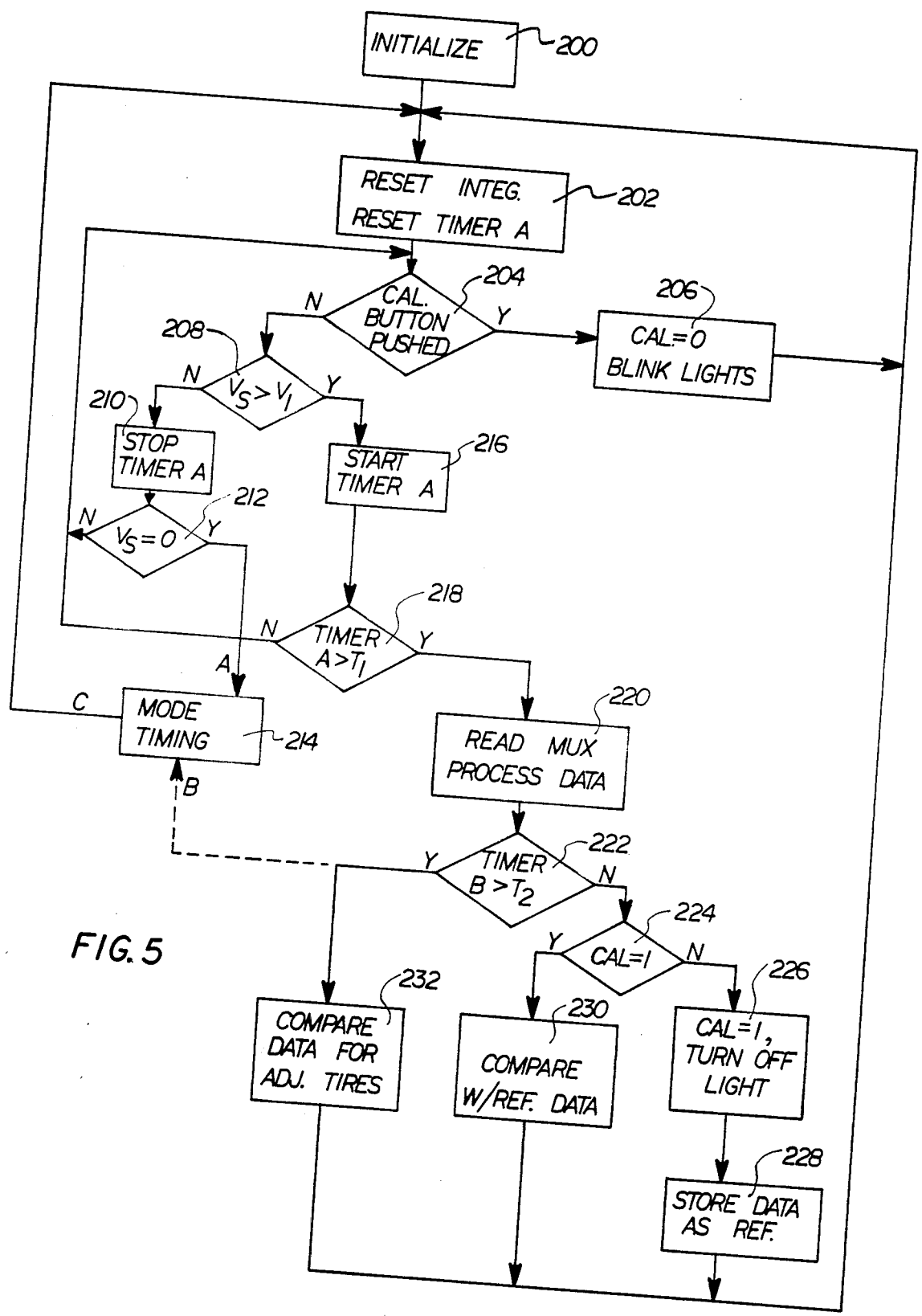
FIG. 5 is a flow chart illustrating the overall flow of operations performed by the microcomputer used in the FIG. 4 circuitry.

FIG. 5 is an overall flow chart of the operations performed by the microcomputer 100. Whenever the ignition switch of the vehicle is turned on, power is supplied to the microcomputer system 48 shown in FIG. 4. As mentioned above, power is continuously applied to the RAM and at least one of the timers associated with the microcomputer. When power is applied to the microcomputer, it proceeds through an initialization routine wherein it sets all internal registers to appropriate initial states, and generally conducts internal and external "housekeeping" operations. The microcomputer then proceeds on to step 202, wherein it applies a reset signal upon reset line 82, such that all of the integrators associated with the filter banks 64, 90, 92 and 94 are reset. Internal timer A is also reset at this time, after which it begins timing the integration interval. The microcomputer then proceeds on to step 204, wherein it examines the logic signals being applied to input line 116 via the calibration switch 114.

If the logic signal derived from the calibration switch is at a low logic level, the calibration button is being depressed by the operator. The microcomputer then proceeds on to step 206. In step 206, a calibration flag CAL is reset to a zero state, and the four lamps associated with the light array 104 are set such that they all blink in unison. The microcomputer then returns to step 202. The microcomputer thereafter continues cyclically to execute steps 202, 204 and 206 until the calibration button is released.

When the calibration button is released, the logic signal on input line 116 shifts to a high logic level. The microcomputer notes the high logic level in step 204, and jumps out of the loop to step 208. In step 208, the vehicle speed is determined by measuring the time interval between two successive pulses at the output of the speed sensor 50. This measurement can be done by any conventional hardware or software technique. The vehicle speed is then compared against a preset limit $V_1$ which may be, for example, somewhere between 10 and 25 miles per hour. If the vehicle speed is below the limit, program flow continues to step 210, wherein timer A is stopped. Because timer A is stopped, the period of time during which the vehicle is traveling at a speed less than speed $V_1$ will not be included in the integration time measured by timer A. The timer is stopped when the vehicle speed is low because usually only small vertical accelerations occur then, adding little to the integrals accumulated by the filter banks. After stopping the timer in step 210, the program continues with step 212, wherein the vehicle speed is compared with the second limit, in this case zero. If the vehicle speed is zero (i.e., the vehicle is stopped), the microcomputer continues on to step 214, which is referred to in FIG. 5 as the "mode timing procedure".

The mode timing procedure is shown with greater particularity in FIGS. 6A and 6B and will be described hereinafter. Essentially, this procedure determines the length of time that the vehicle is stopped. If the vehicle is stopped for more than a preselected period of time, then it can be presumed that the tires have cooled to ambient temperature. Consequently the signal provided by the temperature sensor may be considered to be a true measure of the temperature of the tires. If the stop is for a period shorter than this selected time interval, then no such presumption can be made concerning the temperature of the tires. Thus, the length of time that the vehicle is stopped determines which mode the system will be in when the vehicle begins moving again. In either case, the microcomputer returns to step 202 when the vehicle begins moving again.

If the vehicle speed, although determined to be less than speed $V_1$ in step 208, was determined to be greater than zero in step 212, the microcomputer returns to step 204, thereby effectively entering a repeating loop wherein it waits for the vehicle speed to either drop to zero or to rise above $V_1$. As stated above, the microcomputer will exit the loop via step 214 in the event the vehicle speed drops to zero. If the vehicle speed rises above $V_1$, the microcomputer exits the loop via step 216. In step 216, timer A is restarted, whereupon the timing of the integration interval is continued.

In step 218, the contents of timer A are examined to determine whether or not the integration interval, as measured by timer A, has lasted long enough for significant information to have been accumulated by the integrators. This time interval (T1) may, for example, be on the order of two minutes or longer. If timer A indicates that less than T1 minutes have elapsed, the microcomputer returns to step 204. The microcomputer then repeats steps 204-218 until such time as the vehicle speed drops to zero or the length of the integration period as measured by timer A exceeds T1. When it is determined in step 218 that the timer A reading is greater than T1, the microcomputer proceeds to step 220. In step 220, the microcomputer provides address signals to the multiplexer 96 such that the outputs of the plural integrators associated with the four filter banks 64, 90, 92 and 94 are read in sequence. The data thus acquired is processed so as to locate the resonant frequency for each of the tires. The resonant frequency is then normalized in accordance with the measured ambient temperature. The operations performed in step 220 are shown in greater detail in FIG. 7. The microcomputer then proceeds on to step 222.

In step 222, the microcomputer examines the time registered by timer B. Timer B is occasionally reset during the mode timing procedure 214. The time registered in timer B is indicative of the amount of time that the vehicle has been driven since the tires last had a chance to cool off to ambient temperature. If the time thus registered is less than T2 (for example, five to ten minutes), then presumptively friction heating of the tires has not yet had an opportunity to warm them substantially above the ambient temperature. The tires can thus be presumed to be at ambient temperature. In this event, the resonant frequency measured for each of the tires, as temperature compensated in accordance with ambient temperature, can be compared against the reference data stored in memory. To accomplish the comparison, the microcomputer proceeds on to step 224.

In step 224, the logic state of the calibration flag CAL is examined. If CAL has a logic value of zero, then it follows that the calibration button was pushed just before the integrators were last reset. The newly measured resonant frequencies can then be presumed to represent correct inflation pressures for all four tires. When the calibration flag has a logic value of zero, the microcomputer proceeds on to step 226. In step 226, the calibration flag is reset to a logic value of 1, and the four lamps associated with the control and display panel 54 are turned off. (It will be recalled that the four lamps were set blinking in step 206.) Thereafter, the microcomputer proceeds on to step 228 wherein the data acquired during step 220 is stored in RAM for use as reference data. The microcomputer then returns to step 202 to begin the process anew.

If it is determined in step 224 that the calibration flag has a logic value of 1, then it follows that the data acquired and processed in step 220 is not reference data. The microcomputer jumps to step 230, wherein the data acquired in step 220 is compared with the reference data last stored in memory in step 228. The resonant frequency of each tire, as determined in step 220, is compared with the "reference" resonant frequency for the same tire. If the resonant frequency for any tire has decreased by more than a preselected tolerance, it is presumed that the inflation pressure of that tire is low. The microcomputer then causes the lamp of the lamp array 104 corresponding to the low tire to be steadily illuminated. Thereafter, the microcomputer will return to step 202 to repeat the data acquisition and processing procedure.

If, in passing through step 222, it is determined that the vehicle had been driven for a substantial period of time (more than T2 minutes) since the tires last had an opportunity to cool off to ambient temperatures, it can no longer be presumed that the tires are at ambient temperature. Thus the data recently acquired from the tires cannot be directly compared with the reference data stored in memory. In this event, the microcomputer proceeds on to step 232. In step 232, the data acquired from each tire is compared against the data acquired from the corresponding tire on the opposite side of the vehicle. In other words, the resonant frequency of the left front (LF) tire is compared against the resonant frequency measured for the right front (RF) tire. Similarly, the resonant frequency measured for the right rear (RR) tire is compared against the resonant frequency measured for the left rear (LR) tire. Presumably, the opposite tires endure similar, if not identical, environments and the effects of friction heating on the tires will be the same for both. The comparison process is described hereinafter with reference to FIG. 8. Once again, any tire inflation deviations detected will be reflected by steady illumination of corresponding lamps of the lamp array 104. Thereafter, the microcomputer returns to step 202 to repeat the data acquisition process.

Figure 6A:
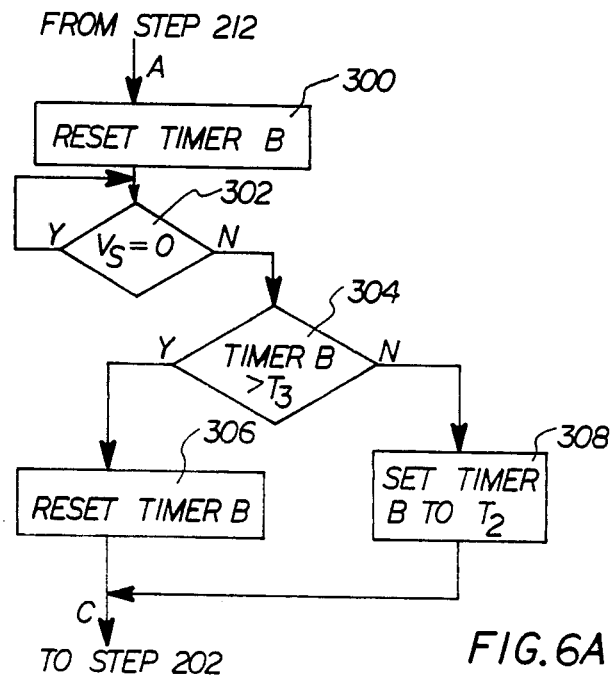
FIGS. 6A and 6B are more detailed representations of two alternative embodiments of one of the blocks of the FIG. 5 flow chart.

FIG. 6A is a more detailed flow chart of the operations performed during the mode timing procedure 214 shown in FIG. 5. As shown in FIG. 6A, the mode timing procedure 214 begins with a step 300 wherein one of the timers (timer B) of the microcomputer is reset to a zero state, and begins counting upward from the zero state. Timer B thus begins counting the amount of time that the vehicle is at rest. In step 202, which follows, the vehicle speed is measured and compared with a zero value. If the vehicle speed is equal to zero, the procedure merely remeasures the speed, and repeats the comparison step. Step 302 thus repeats continuously until it is determined that the vehicle speed is no longer equal to zero, at which time the procedure continues on with step 304. In step 304, timer B is read, and the time registered in timer B is compared with a limiting time T3. The time T3 represents the amount of time necessary for the tires to return to ambient temperature while the vehicle is at rest. T3 may, for example, be set equal to one or more hours. If the time registered in timer B is greater than time T3, then the procedure continues with step 306, wherein timer B is reset to the zero value and begins counting anew. Thus, timer B will now begin measuring the amount of time since the vehicle was last at rest. The procedure then exits to step 202 of FIG. 5. If it is determined in step 304 that the time registered in the B timer is less than T3, however, the procedure continues to step 308, wherein timer B is set to a value of T2 or greater. The procedure then again exits to step 202 of FIG. 5.

It will be noted that the only way in which timer B will have a value less than T2 upon arriving at step 222 of FIG. 5 is if less than a time interval T2 has elapsed since the timer was reset in step 306 of FIG. 6A. Furthermore, timer B is only reset in step 306 if the vehicle has been at rest long enough for the tires to return to ambient temperature.

Steps 302, 304, 306 and 308 are also performed during the initialization procedure 200 each time power is reapplied to the microcomputer.

Figure 6B:
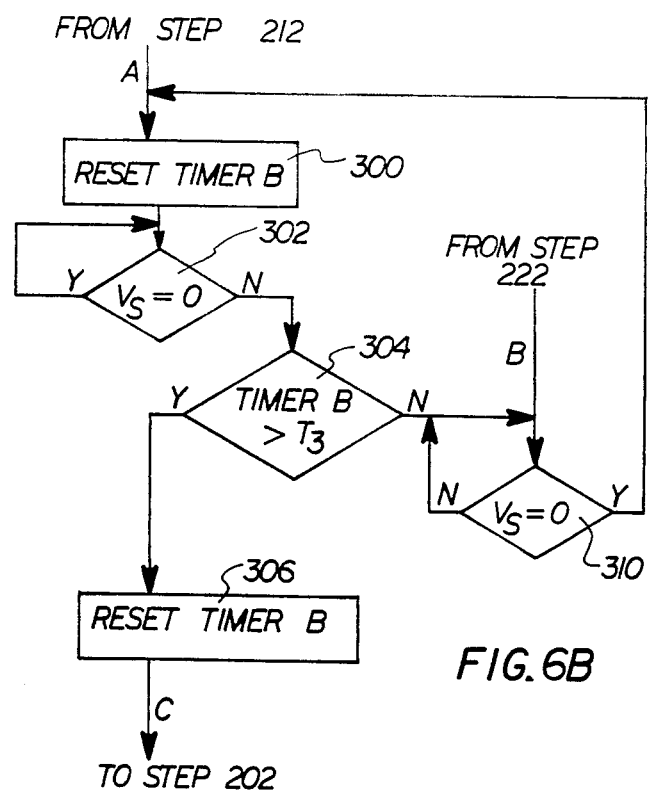

FIG. 6B illustrates a form which the mode timing procedure 214 may have in an alternate embodiment of the invention. In the alternate embodiment, the step 232 of FIG. 5 is eliminated, and the procedure instead jumps into a new step 310 of the mode timing procedure in the event that it is determined in step 222 that timer B is registering a time greater than T2 (indicating that the tires may no longer be considered to be at ambient temperature). This jump is indicated by the dotted line in FIG. 5.

The FIG. 6B procedure is similar to the FIG. 6A procedure, except that step 308 has been replaced by the new step 310. Therefore, a determination in step 304 that the vehicle has been at rest less than the time interval T3 necessary to return the tires to ambient temperature also results in the procedure jumping to step 310. In step 310, the vehicle speed is determined by monitoring the output of vehicle speed sensor, and the vehicle speed is compared with a zero value. As long as the vehicle speed is above zero (in other words, as long as the vehicle is moving), the microcomputer repeats the step. Thus, no further measurements of tire resonant frequency are performed. When the vehicle returns to a rest state, however, the microcomputer jumps back to step 300.

The net effect of the change between FIGS. 6A and 6B is that the microcomputer will only perform inflation pressure checks when the vehicle has just begun operating after a relatively long period of inactivity. The alternative procedure of FIG. 6B may be desirable in circumstances in which, for one reason or another, it is not possible or desirable to cross check data from tires on opposite sides of the motor vehicle.

Figure 7:
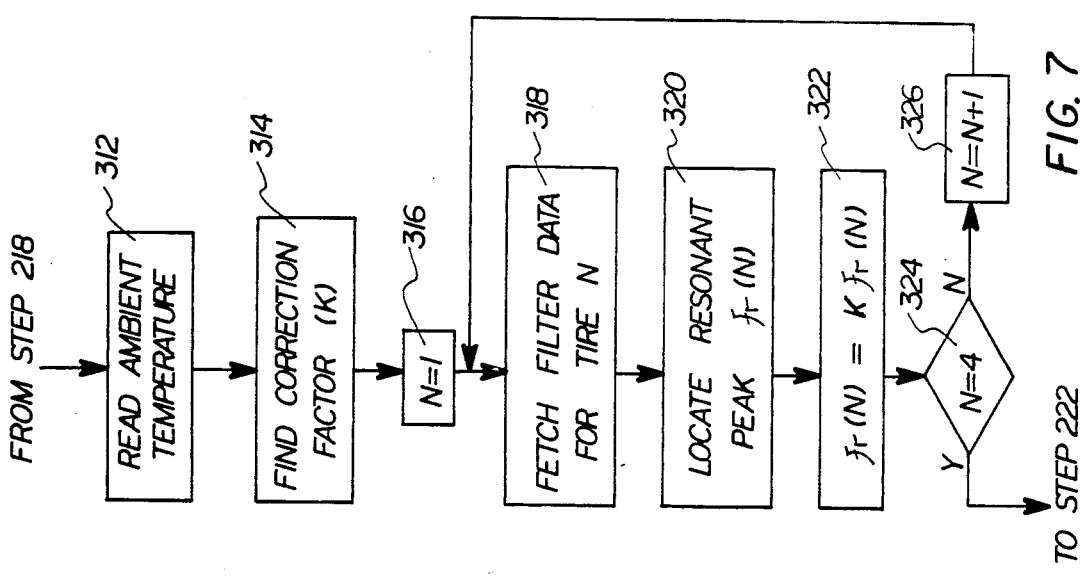
FIG. 7 is a more detailed representation of the operations performed in another of the blocks of the FIG. 5 flow chart.

FIG. 7 is a more detailed flow chart of the operations performed during the data processing step 220 of FIG. 5. Procedure 220 is included to read the information provided by the filter banks associated with each tire, to determine the resonant frequency of each tire from the filter bank information, and to normalize the resonant frequency thus determined in accordance with temperature. The purpose of the normalization is to eliminate the influence of ambient temperature changes upon the measured resonant frequency. The resonant frequency measured at 70° F., for example, will be different from the frequency measured at an ambient temperature of 50° F., although the cold inflation pressure of the tire remains constant.

The normalization procedure presumes that a multiplication factor can be selected for each given temperature such that a resonant frequency measured at a temperature, when multiplied by the multiplication factor for that temperature, will yield a resonant frequency corresponding to the frequency which would have been measured had the ambient temperature been at the normalization value (such as 50° F., for example). A "look-up table" correlating each temperature with a corresponding normalization multiplier will be empirically determined for a given vehicle and tire combination. The normalization multiplier will be equal to unity at the normalization temperature, but may be slightly above or below unity at other temperatures. The look-up table is stored in the solid state memory of the microcomputer 100 of FIG. 4.

The procedure of FIG. 7 begins with a step 312 wherein the microcomputer provides a control signal to the multiplexer such that the output of the signal processor 116 associated with the temperature sensor 152 is connected to the analog-to-digital converter 102. The digital output signal provided by A/D converter 102 therefore represents ambient temperature. The signal is read by the microcomputer 100 and is used in step 314 to access the look-up table stored in solid state memory. The value read from memory will be a correction factor K. The correction factor K represents the value by which the measured resonant frequency for each tire must be multiplied in order to provide the resonant frequencies which would have been measured at the standardized temperature of, for example, 50° F.

Instead of storing a complete look-up table, the system could store a shorter look-up table including multipliers for more widely spaced temperatures. The microcomputer would then be programmed to interpolate between the discrete values stored in the table. Alternatively, a mathematical equation relating temperature to normalization multiplier could be derived by conventional curve fitting techniques, with the equation being stored in memory in place of the look-up table. The microcomputer would thus be able to calculate a normalization multiplier merely by plugging the measured temperature into the equation.

In step 316, a counting variable N is set to an initial value of 1. In the next step, 318, the microcomputer fetches data from the four integrators associated with the filter bank for the tire identified by the current value of the counting variable N. As described previously, the data acquisition is accomplished by appropriate control of the multiplexor 96 and A/D convertor 102. The microcomputer then examines the data to locate the frequency of the resonant peak in step 320. The resonant peak frequency for tire N is designated in FIG. 7 as fr(n). The peak frequency may be calculated either by matching a suitable curve to the measured data points and locating the peak of the matched curve, or by simply locating the integrator output having the largest value and presuming that the peak rests in the center of the bandpass for the corresponding filter. The procedure then continues with step 322, in which the resonance frequency is temperature corrected by multiplication by the correction factor determined in step 314.

In step 324, the counting variable N is examined to determine which tire was last processed. If N has a value of 4, then the processing of tire data is complete and the procedure jumps to step 222 of FIG. 5. If N does not have a value of 4, the procedure continues with step 326, wherein N is incremented by a value of 1, and then returns to step 318.

Figure 8:
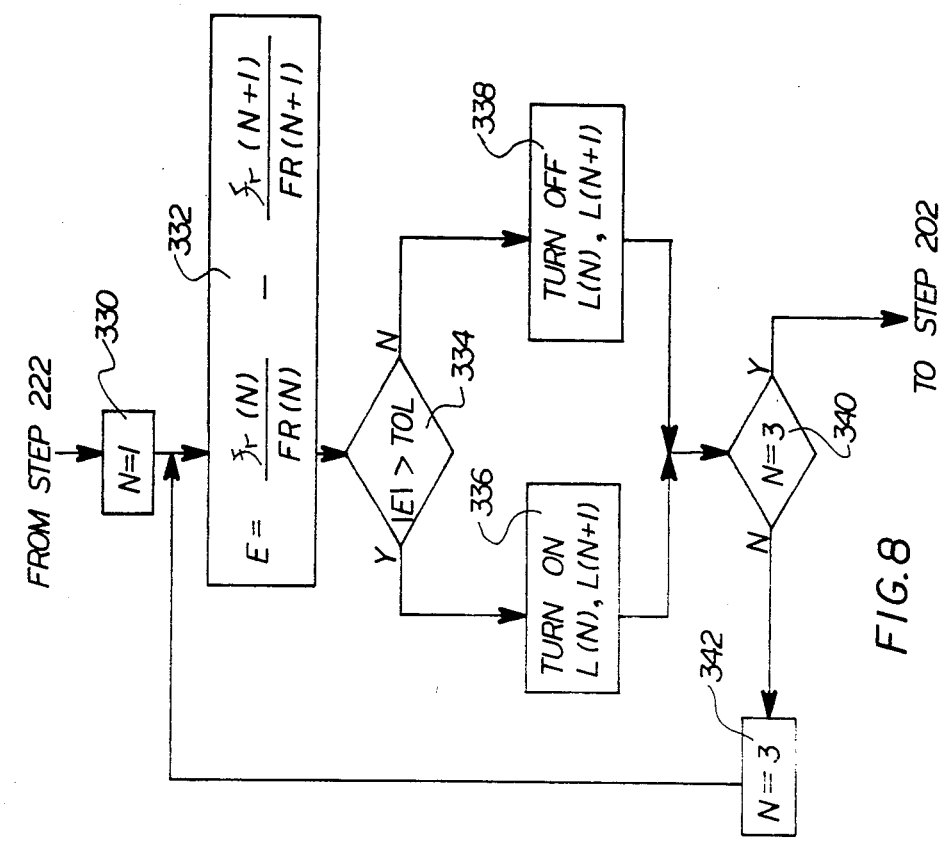
FIG. 8 is a more detailed representation of the operation performed in still another block of the flow chart of FIG. 5.

FIG. 8 is a more detailed flow chart of the operations performed during the procedure 222 of FIG. 5. Procedure 222, it will be recalled, is provided to compare resonant frequency data of tires on opposing sides of a vehicle at times when no presumptions can be made concerning the temperature of the tires. As shown in FIG. 8, the procedure begins with a step 330 in which the counting variable N is reset to a value of 1. In step 332, which follows step 330, an error value E is calculated by subtracting two ratios from one another. The first ratio is a ratio of the measured resonant frequency for tire N (i.e., fr(N)) to the reference (stored) resonant frequency for tire N (i.e., FR(N)). The second ratio is the ratio of the measured resonant frequency for tire N+1 (i.e., fr(N+1)) to the reference (stored) resonant frequency for tire N+1, i.e., (FR(N+1)). It is presumed that the two ratios will have approximately equal values unless the inflation of one of the two tires has diminished substantially relative to the other.

In step 334, the absolute magnitude of the error signal E determined in step 332 is compared with a tolerance. If the absolute magnitude of the error signal E is greater than the tolerance, the procedure continues with step 336. In step 336 the lights on control panel 54 associated with tires N and N+1 are illuminated, indicating that the operator should check the inflation of the two tires. If the absolute magnitude of the error signal E is determined in step 334 to be less than the tolerance, however, the procedure instead jumps to step 338, wherein the two lights associated with the tires N and N+1 are turned off. (Unless there was an error in the previous program cycle, the lights will already be off when the microcomputer executes step 338.) After each of steps 336 and 338, the procedure continues with step 340, wherein a counting variable N is compared with a value of 3. If N does not have a value of 3, the procedure will continue with step 342. In step 342 the counting variable N is given a value of 3 such that, in a subsequent pass through steps 332–340, data for tires 3 and 4 is processed. The procedure continues to step 332 upon the conclusion of step 342.

When it is determined in step 340 that the counting variable N does indeed have a value of three, then the microcomputer exits from the procedure, continuing on with step 202 of FIG. 5.

Although the invention has been described with respect to a preferred embodiment, it will be appreciated that various rearrangements and alterations of parts may be made without departing from the spirit and scope of the present invention, as defined in the appended claims.

Thus, for example, although in the embodiment described above the tire inflation pressure is monitored merely by measuring resonant frequency, more complicated frequency analysis algorithms could instead be used. It has been found that the peak PK influenced by the tire inflation pressure not only changes in frequency, but also in amplitude and width, with changes in tire pressure. Two, or even all three of these peak characteristics could be measured, stored as reference values, and used in subsequent comparisons. The total comparison error would then be an additive and/or multiplicative function of the errors of all three characteristics.

What is claimed is:

1. Apparatus for detecting changes in inflation pressure of a tire on a vehicle, said apparatus comprising:
    means for generating an electric signal indicative of vertical accelerations experienced by said tire, said accelerations exhibiting a resonant frequency dependent upon inflation pressure of said tire;

means for determining a first value of the resonant frequency experienced by said tire at a first time and for determining a second value of the resonant frequency experienced by said tire at a second time, both determined from said generated electric signal indicative of the vertical accelerations experienced by said tire;

means for storing said determined first value of the resonant frequency experienced by said tire;

comparing means for comparing said determined second value of the resonant frequency experienced by said tire with said stored determined first value of the resonant frequency experienced by said tire and for generating a signal indicative of a difference therebetween; and alarm means responsive to said comparing means for providing an alarm to a driver when said signal generated by said comparing means indicates there is a difference between said stored determined first value of the resonant frequency and said determined second value of the resonant frequency greater than a predetermined amount.

2. The apparatus of claim 1 wherein said means for determining said first and said second values of the resonant frequency experienced by said tire comprises:
a plurality of bandpass filters, each of said bandpass filters capable of passing an electric signal having a predetermined frequency range different from the frequency ranges of other of said bandpass filters;
a plurality of signal converting means, each bandpass filter having an associated signal converting means for outputting a DC voltage signal having an amplitude proportional to the average power of a frequency component of said generated electrical signal indicative of the vertical accelerations experienced by said tire; and
measuring means for measuring the amplitude of the DC signal outputted by each signal converting means.

3. The apparatus of claim 2 wherein said measuring means comprises:
multiplexing means for selectably monitoring each signal converting means separately;
an analog-to-digital converter for converting a monitored DC voltage signal outputted by a signal converting means into a digitally encoded signal; and
a microcomputer to process each digitally encoded signal from said analog-to-digital converter.

4. The apparatus of claim 2 wherein each signal converting means comprises:
signal rectifying means for rectifying said generated electric signal indicative of vertical accelerations experienced by said tire; and
integrator circuit means for integrating said rectified signal.

5. The apparatus of claim 1 further including a vehicle speed sensor for generating an electric signal indicative of vehicle speed, said means for determining said first and said second values of the resonant frequency experienced by said tire making said determinations when the vehicle speed signal indicates vehicle speed being greater than a predetermined value.

6. The apparatus of claim 1 further including means for updating said stored determined first value of the resonant frequency experienced by said tire.

7. The apparatus of claim 1 further including means for updating said determined second value of the resonant frequency experienced by said tire at periodic intervals.

8. The apparatus of claim 1 further including:
means for monitoring ambient temperature and for generating an electric signal indicative thereof; and
means for normalizing said determined first and second values of the resonant frequency experienced by said tire responsive to the monitored ambient temperature.

9. Apparatus for detecting changes in inflation pressure of at least two tires on a vehicle, said apparatus comprising:
plurality of signal generating means, each tire of said at least two tires having an associated signal generating means for generating an electric signal indicative of vertical accelerations experienced by its associated tire, said accelerations exhibiting a resonant frequency dependent upon inflation pressure of its associated tire;
means for determining a value of the resonant frequency experienced by each tire of said at least two tires at a first time and at a second time;
means for determining the driving time of the vehicle;
first means for comparing, when said determined driving time is not greater than a predetermined value, the determined value of the resonant frequency experienced by a selected tire of said at least two tires at said first time with the determined value of the resonant frequency experienced by said selected tire at said second time and for generating a signal indicative of the difference therebetween;
second means for comparing, when said determined driving time is greater than said predetermined value, the determined value of the resonant frequency experienced by said selected tire with the determined value of the resonant frequency experienced by another of said at least two tires and for generating a signal indicative of the difference therebetween; and
indicator means responsive to said first means and to said second means for providing an alarm to a driver when said signal generated by said first means indicates a difference between the determined value of the resonant frequency experienced by said selected tire at said first time and the determined value of the resonant frequency experienced by said selected tire at said second time is greater than a predetermined value, or when said signal generated by said second means indicates a difference between the determined value of the resonant frequency experienced by said selected tire and the determined value of the resonant frequency experienced by said another tire is greater than a predetermined value.

10. The apparatus of claim 9 wherein said means for determining a value of the resonant frequency experienced by each tire of said at least two tires at a first time and at a second time comprises:
a plurality of bandpass filters, each of said bandpass filters capable of passing an electric signal having a predetermined frequency range different from the frequency ranges of other of said bandpass filters;
a plurality of signal converting means, each bandpass filter having an associated signal converting means for outputting a DC voltage signal having an amplitude proportional to the average power of a frequency component of said generated electric signal indicative of the vertical accelerations experienced by each tire; and measuring means for measuring the amplitude of the signal outputted by each signal converting means.

11. The apparatus of claim 10 wherein said measuring means comprises:

multiplexing means for selectably monitoring each signal converting means separately;

an analog-to-digital converter for converting a monitored DC voltage signal outputted by a signal converting means into a digitally encoded signal; and a microcomputer to process each digitally encoded signal from said analog-to-digital converter.

12. The apparatus of claim 10 wherein each of said signal converting means comprises:

signal rectifying means for rectifying said generated electric signal indicative of vertical accelerations experienced by its associated tire; and integrator circuit means for integrating said rectified signal.

13. The apparatus of claim 9 further including a vehicle speed sensor for generating an electric signal indicative of vehicle speed, said means for determining a value of the resonant frequency experienced by each tire of said at least two tires at a first time and at a second time making such determinations when the vehicle speed signal indicates vehicle speed being greater than a predetermined value.

14. The apparatus of claim 9 further including means to reset said means for determining driving time of the vehicle when said vehicle is not driven for a predetermined amount of time.

15. The apparatus of claim 9 further including means for updating each determined value of the resonant frequency experienced by each tire of said at least two tires.

* * * * *

UNITED STATES PATENT AND TRADEMARK OFFICE
CERTIFICATE OF CORRECTION

PATENT NO. : 4,574,267
DATED : March 4, 1986
INVENTOR(S) : As Corrected Below

It is certified that error appears in the above-identified patent and that said Letters Patent is hereby corrected as shown below:

On the title page inventors should read

--Trevor O. Jones, Shaker Heights, Ohio; Neal A. Richardson, Rancho Palos Verdes, California; Allan W. Vogele, Middleburg Heights, Ohio--

Signed and Sealed this

Eighth Day of July 1986

[SEAL]

Attest:

DONALD J. QUIGG

Attesting Officer

Commissioner of Patents and Trademarks